UNITED STATES PATENT OFFICE.

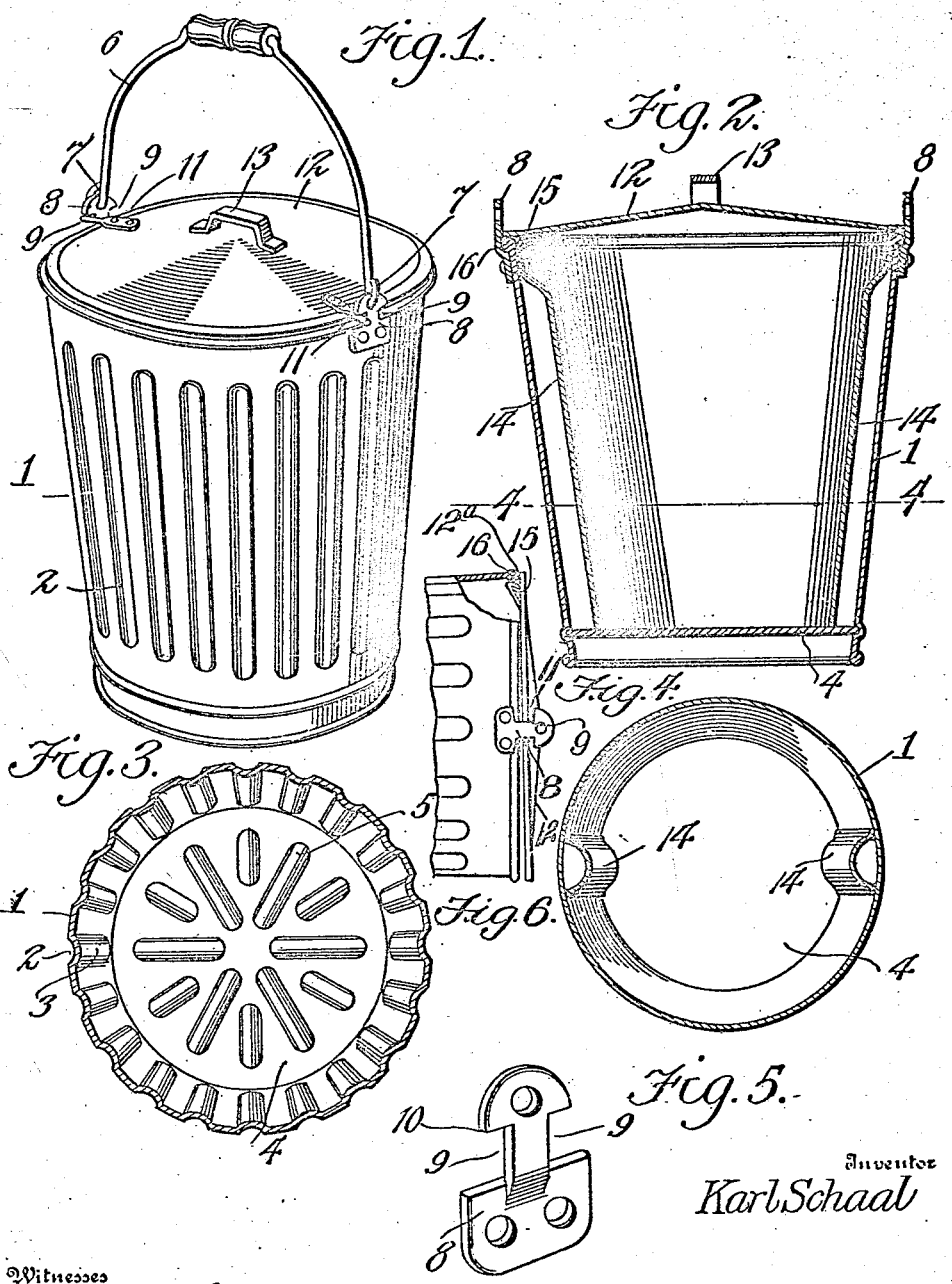

KARL SCHAAL, OF SEWARD, NEBRASKA.

VEGETABLE-PEELER.

No. 898,931.  Specification of Letters Patent.  Patented Sept. 15, 1908.

Application filed February 9, 1907. Serial No. 356,636.

*To all whom it may concern:*

Be it known that I, KARL SCHAAL, a citizen of the United States, residing at Seward, in the county of Seward and State of Nebraska, have invented new and useful Improvements in Vegetable-Peelers, of which the following is a specification.

This invention relates to washing vessels designed for washing potatoes or other vegetables or fruits and has for its objects to provide a comparatively simple, inexpensive device of this character which may be readily manipulated, one whereby the washing operation may be quickly and efficiently done, and this without wetting the operator's hands, and one from which the unclean water may be conveniently discharged at the completion of the washing action.

A further object of the invention is to provide a vessel of this character to which the cover may be quickly applied and securely fastened in place, one wherein the cover will be susceptible of a slight rocking motion to permit of the water being dispensed from the vessel without removing the cover, and one whereby the washing operation may be performed by imparting manually to the vessel a rotary oscillatory motion.

With these and other objects in view, the invention comprises the novel features of construction and combination of parts hereinafter more fully described.

In the accompanying drawings, Figure 1 is a perspective view of a washing vessel embodying the invention and showing the cover in applied position. Fig. 2 is a vertical longitudinal section taken centrally through the vessel and illustrating a slightly modified embodiment of the invention. Fig. 3 is a horizontal section of the form shown in Fig. 1. Fig. 4 is a similar view taken on the line 4—4 of Fig. 2. Fig. 5 is a perspective view of one of the bail-engaging ears. Fig. 6 is a fragmentary side elevation of the pail with parts in section showing the cover in the partial open or pouring off position, whereby the vegetables are retained in the pail while the water and sediment is allowed to drain off.

Referring to the drawings and particularly to Figs. 1, 3 and 5, 1 designates a washing vessel or bucket composed of sheet metal or other appropriate material and preferably of the form shown having pressed or otherwise formed in its side wall a plurality of longitudinally-extending depressions 2 which produce on the interior of the vessel a plurality of corresponding ribs or projections 3 disposed at appropriately spaced intervals wholly around the perimeter of the vessel, while provided on the inner face of the vessel bottom 4 and preferably by stamping or pressing the metal into shape, is a series of radially-disposed ribs or projections 5 which, together with the ribs 3, serve to agitate the contents of the vessel during the washing operation, as more fully hereinafter described.

The vessel 1 is provided with a bail or handle 6 of usual form having terminal hooks 7 engaged with openings or eyes formed in opposed vertical ears 8, attached to the vessel by rivets or otherwise, and arranged to project above the upper edge of the vessel, as shown, there being formed in the upwardly projecting portions of the ears lateral recesses 9 forming shoulders 10 to be engaged by outwardly projecting retaining members or fingers 11 attached to a lid or cover 12 formed to close the top of the vessel and provided with a hand-piece or strap 13.

The fingers are located slightly at one side of a diametrical line passing through the center of the cover, and they have sufficient play in the top and bottom sides of the recesses 9 to permit the cover to tilt slightly open when the pail is turned on its side for permitting the water and dirt to drain out while the partially open cover holds the potatoes or other vegetables in the pail. When the cover is in partial open position, as shown in Fig. 6, the fingers 11 bear against the shoulders 10 or top sides of the recesses 9 and the cover bears against the pail at 12$^a$. It will thus be seen that the cover is positively held on the pail when the latter is turned on its side into emptying position. Another important advantage in having the fingers 11 engage both ears 8 on the same side is that the cover will be firmly retained in position on the pail when the latter is whirled back and forth during the washing operation.

In practice, the potatoes, or other suitable material to be washed, are placed in the vessel and covered with water, after which the cover 12 is applied for closing the top of the vessel and secured in closed position by engaging the retaining fingers 11 beneath the shoulders 10, after which the bail 6 is grasped and with the vessel hanging downward at arms length, the wrist and forearm of the operator is twisted back and forth, thereby imparting to the vessel a rotary, oscillatory motion for causing a whirling motion of the water within the vessel, this movement of the water being reversed at successive intervals in accord with the reversal of the rotation of the vessel. Owing to the provision of the ribs or projections 3 and 5, the potatoes or other material in the vessel will be thoroughly agitated, thus removing the dirt and polishing the potatoes.

In the form of the device disclosed in Figs. 2 and 4, the vessel 1 is provided upon its interior with a pair of opposed longitudinally extending ribs or projections 14 made separate from and attached to the side walls of the vessel, these ribs being of a greater dimension in cross-section than are the ribs 3, while in the device under consideration, the ribs 5 are omitted from the bottom 4 of the vessel. The upper ends of the members 14 are riveted to the pail and the same rivets are employed to secure the ears 8 to the pail. Also in the modified embodiment of the invention, the cover 12, which closes the upper end of the vessel, is provided on its inner face with a spring-metal engaging member 15 adapted for frictional engagement with a bead 16 formed at the upper edge of the vessel which will be provided for holding the cover in place.

It will be observed that the cover is shown in Fig. 2 ninety degrees from its normal position with respect to the pail, as the catch 15 is adapted to engage the bead 16 at a point midway between the ears 8 so that the said catch will coöperate with the fingers 11 to hold the cover in position, while permitting at the same time, the cover to tilt open as shown in Fig. 6. In the operation of this form of the device, the potatoes or the like are placed in the vessel and covered with water, after which the vessel is manually rotated in the manner heretofore explained, thereby causing the water to whirl back and forth between the potatoes and the latter to move one over another, with the result that dirt is removed and the potatoes polished.

In both forms of the device, after the vegetable or other material has been washed, the vessel may be tilted on its side, so that the fingers 11 will be on the upper side of the ears 8. The cover will thus remain in place, but is capable of tilting sufficiently on the fingers 11 to allow the water to drain.

Having thus described the invention, what I claim is:—

1. A device of the class described comprising a pail, internal ribs on the pail, ears secured to the pail at diametrically opposite points and rising from the upper edge thereof and provided with recesses in corresponding sides, a handle pivotally connected with the ears, a cover adapted to rest on the pail, members secured to the top of the cover and projecting beyond the periphery thereof to engage in corresponding recesses of the ears, said members being of less transverse dimension than the height of the recesses to provide sufficient play to permit the cover to tilt open when the pail is turned on its side to pour out the washing fluid and the said members being arranged to prevent the cover from turning independently of the pail as the latter is oscillated.

2. A device of the class described comprising a pail, internal members forming ribs, rivets for securing the members to the pail, ears secured outside the pail by the rivets, a handle attached to the ears, a cover, and means on the cover adapted to engage the ears to hold the cover in position.

In testimony whereof, I affix my signature in presence of two witnesses.

KARL SCHAAL.

Witnesses:
 TEOLER C. NELSON,
 JOHN L. JORGENSEN.

Correction in Letters Patent No. 898,931.

It is hereby certified that in Letters Patent No. 898,931, granted September 15, 1908, upon the application of Karl Schaal, of Seward, Nebraska, the title of the invention was erroneously written and printed on the face of the patent, in the heading to the specification and drawings, and in line 6, of the preamble of the specification, as "Vegetable-Peelers," whereas the said title should have been written and printed *Vegetable-Washers;* and that the said Letters Patent should be read with this correction therein that the same may conform to the record of the case in the Patent Office.

Signed and sealed this 16th day of March, A. D., 1909.

[SEAL.]

C. C. BILLINGS,
*Acting Commissioner of Patents.*